US006884273B2

United States Patent
Kopec et al.

(10) Patent No.: US 6,884,273 B2
(45) Date of Patent: Apr. 26, 2005

(54) MULTICELL CYCLONE AND METHOD FOR PRODUCING IT

(75) Inventors: Edvard Kopec, Speyer (DE); Volker Greif, Harthausen (DE); Klemens Dworatzek, Edingen (DE); Jens Haehn, Heidelberg (DE); Marion Hartmann, Neulussheim (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 89 days.

(21) Appl. No.: 10/229,272

(22) Filed: Aug. 28, 2002

(65) Prior Publication Data

US 2003/0057151 A1 Mar. 27, 2003

(30) Foreign Application Priority Data

Aug. 31, 2001 (DE) .......................................... 101 42 701

(51) Int. Cl.[7] .............................................. B01D 45/16
(52) U.S. Cl. ......................... 55/346; 55/347; 210/512.2
(58) Field of Search ................... 55/346–349; 210/512.2

(56) References Cited

U.S. PATENT DOCUMENTS

| | | | | |
|---|---|---|---|---|
| 2,533,991 A | * | 12/1950 | Blomquist et al. ............. | 55/349 |
| 3,520,114 A | * | 7/1970 | Pall et al. ...................... | 55/347 |
| 3,707,830 A | * | 1/1973 | Gustavsson ................... | 55/410 |
| 3,915,679 A | | 10/1975 | Roach et al. .................. | 55/347 |
| 4,242,115 A | | 12/1980 | Harold et al. ................. | 55/347 |
| 4,537,608 A | * | 8/1985 | Koslow ........................ | 55/337 |
| 4,746,340 A | | 5/1988 | Durre et al. ................... | 55/347 |
| 4,767,425 A | * | 8/1988 | Camplin et al. .............. | 55/306 |
| 4,820,427 A | * | 4/1989 | Ryynanen .................... | 210/788 |

FOREIGN PATENT DOCUMENTS

| | | |
|---|---|---|
| DE | 29819335 | 5/1999 |
| EP | 0256491 | 2/1988 |
| GB | 1278488 | 6/1972 |

* cited by examiner

Primary Examiner—Richard L. Chiesa
(74) Attorney, Agent, or Firm—Crowell & Moring LLP

(57) ABSTRACT

A multicell cyclone with a plurality of cyclone cells and a method for the production thereof, in which the cyclone cells of the multicell cyclone are combined into groups from which deposited particles are cleaned out by vacuum suction through channel structures. This permits better control of the discharge of separated particles. Vacuum suction of the separated particles can be effected, for instance, via openings (19) which are jointly provided for the group (21) of cyclone cells. The group of cyclone cells can furthermore be produced as a module, which can, for instance, be assembled from two parts (12, 13) in which like structural elements of a group of cyclones are combined into one respective part. This makes it possible to optimize the separation result with little structural complexity and at low production cost.

6 Claims, 3 Drawing Sheets

MULTICELL CYCLONE AND METHOD FOR PRODUCING IT

BACKGROUND OF THE INVENTION

The invention relates to a multicell cyclone comprising a plurality of cyclone cells connected in parallel. The invention further relates to a method for producing a group of such cyclone cells.

Multicell cyclones of this type are known, for instance, from German Utility Model DE 298 19 335 U1. According to this document, the aforementioned multicell cyclones are used, for example, for the preliminary separation of particles in air filters. FIG. 1 of the aforementioned document shows a modular construction of the multicell cyclone in which the cyclone cells 20 are integrated between perforated plates 19. This creates a collection chamber between these perforated plates for the separated particles, which can be emptied through a particle discharge 26. The cyclone cells 20 are standard components and can therefore be produced cost-effectively due to the large production quantities. Combining the cyclone cells thus permits cost-effective implementation of a cyclone that requires a small unit volume in relation to the possible volume flow rate. However, it is not readily possible to combine an unlimited number of cyclone cells in a multicell cyclone. The greater the number of cyclone cells provided, the greater the problem of removing the separated substances through particle discharge 26. In operation, this may result in clogging in the individual cyclone cells. This has a negative effect on the separation result of the multicell cyclone and the pressure loss caused by the cyclone. Cleaning large arrays of cyclone cells therefore requires a plurality of particle discharge outlets, which increases the complexity of the design and affects the economic efficiency of the correspondingly equipped multicell cyclone.

SUMMARY OF THE INVENTION

Thus, it is an object of the invention to provide an improved multicell cyclone.

Another object of the invention is to provide a multicell cyclone which achieves optimal separation results.

A further object of the invention is to provide a multicell cyclone which will have a relatively long service life.

It is also an object of the invention to provide a multicell cyclone which can be manufactured at reasonable cost.

These and other objects are achieved in accordance with the present invention by providing a multicell cyclone comprising a plurality of cyclone cells, an intake side for the fluid to be cleaned, a discharge side for the cleaned fluid, and a cyclone housing with a particle discharge for substances separated from the fluid, wherein the cyclone cells are arranged in the cyclone housing in groups such that individual groups of cyclone cells are connected to the particle discharge by channel structures, and wherein the channel structures have an expanded cross section, relative to the spacing of the cyclone cells of a group from each other, for carrying away the separated substances.

In accordance with a further aspect of the invention, the objects are achieved by providing a method of producing a group of cyclone cells for a multicell cyclone, wherein each cyclone cell is comprised of structural elements, the method comprising forming at least a portion of the structural elements of the cyclone cells of the group in one piece as a single component such that the single component comprises all structural elements of like type of all the cells of the group.

The multicell cyclone of the invention is constructed in the known manner from individual cyclone cells, which have a common intake side for the fluid to be cleaned and an outflow side for the cleaned fluid. In addition, a particle discharge is provided from which the separated substances can be withdrawn by suction. For this purpose, a vacuum is normally applied, so that a partial stream of the fluid to be cleaned is suctioned off together with the separated materials. For the purpose of this suction, the cyclone cells are placed into a housing into which the outer radial region of the cyclone cells where the correspondingly separated substances accumulate discharges. The cleaned side outlet of the cyclone cells is formed by a center tube, which protrudes into the cyclone cells and thus collects the radially inner volume flow of the fluid to be cleaned. Multicell cyclones can be used for separating substances from both liquids and gases. One application of multicell cyclones is as a preliminary separator in air filters for internal combustion engines.

The invention is characterized in that the cyclone cells are arranged in the housing in groups. The individual groups are arranged in such a way that channel structures are formed, which promote the transport of the separated substances to the particle discharge. These channel structures are formed due to a volume expansion that results in relation to the spacing of the cyclone cells of a group from each other and that provides the cross section for carrying away separated substances. This ensures uniform suction of all the cyclone cells for a given vacuum suction rate. In other words, cyclone cells that are located at a greater distance from the particle discharge are equally suctioned. This effectively counteracts clogging, so that a large number of cyclone cells can be combined into a multicell cyclone with little structural complexity.

The individual groups of cyclone cells are defined by the channel structures, which completely separate them. According to one embodiment, the cyclone cells are arranged within the groups such that adjacent cyclone cells abut or touch one another. This makes it possible to form closed channel structures in which the walls of the cyclone cells form parts of the walls of the channel structure. The channel structures are moreover formed by the housing, which defines the space for withdrawing the separated substances by suction relative to the exterior.

Another embodiment of the invention provides that the groups of cyclone cells are combined into individual modules. These modules have module housings, which in turn form small collection chambers for the separated substances. These collection chambers are provided with openings that discharge into the channel structures inside the cyclone housing. In this manner, the multicell cyclone is formed, as it were, by a plurality of very small multicell cyclones in the form of the modules. These modules advantageously comprise 4 to 10 cells, since suction for this number of cyclone cells by means of a common collection chamber is still completely unproblematic. The openings of the modules, however, end in the above-described channel structures, so that all the modules can be vacuumed out in the same way by suction through the particle discharge. This effectively counteracts clogging of the individual modules as described above.

In accordance with one preferred embodiment of the invention, the modules in turn form units that can be individually inserted into the housing for suction. In this manner, a modular system is realized. The modules can be cost-effectively produced and can be assembled into multicell cyclones in different housings with different numbers of cyclone cells. Thus, the variant with individual modules especially contributes to the economic efficiency of the inventive multicell cyclone.

According to another advantageous embodiment of the invention, the groups of cyclone cells, which can also be formed by the above-described modules, are uniformly arranged. This means, in particular, that the groups of cyclone cells are arranged symmetrically around a central axis. This symmetrical arrangement has the effect that ordered flow conditions are produced inside the housing. Consequently, the separation result by the particle discharge becomes more predictable and the reliability of the multicell cyclone is improved.

In a particularly advantageous embodiment of the invention, the channel structures comprise an annular channel, which encircles all the groups of cyclone cells. This annular channel makes it possible in a simple manner to withdraw the separated substances by suction through the particle discharge. Especially with the use of modules, an arrangement is possible in which the openings of the modules discharge outwardly into the annular channel. This creates short and direct suction paths for the separated substances. In this case, there is consequently no need to create additional channel structures besides the annular channel. Of course, the annular channel can also be combined with channel structures that reach into the interior of the multicell cyclone and thereby divide the individual cyclone cells into groups.

The separation result of the multicell cyclone of the invention can be further enhanced by replacing individual cyclone cells with so-called dummy tubes. These dummy tubes create a direct connection between the intake and the channel structures, making it possible to introduce the fluid into the housing with less pressure loss than would be possible if a corresponding cyclone cell were used. As a result, dummy tubes are advantageously used in areas of the multicell cyclone that are more problematic to clean than the rest of the multicell cyclone, despite the creation of channel structures. The configuration as a dummy tube, which can be used in place of a cyclone cell, makes it possible to optimize the separation result after the design of the multicell cyclone has been completed, without substantially changing the design. Thus, the use of dummy tubes is a cost-effective alternative for optimizing e.g., multicell cyclones produced as made-to-order units by means of tests or while they are already in use.

A method for producing the inventive groups of cyclone cells provides that at least a portion of the structural elements that are required for the cyclone cells are integrated into one component. This multicell component can be produced particularly during the original formation of the cells, e.g., by injection molding. All of a group's structural elements of the same kind are produced in a single process step, so that the entire group of cyclone cells consists of only a single component per structural element. This solution is especially economical since it eliminates a large part of the assembly cost.

According to one advantageous embodiment of the method of the invention, a group of cyclone cells is formed by a base body and an attachment body. The base body comprises the tubular structure of the cyclone cells, which is provided for the conveyance of the fluid to be cleaned. This base body thus extends from the intake up to the point where the separated substances are to be discharged. The attachment body comprises the outlet side for the cleaned fluid, which is formed by center tubes. These center tubes protrude into the base body such that a radially outer area is created in the tubular structure, which is responsible for the separation of the cleaned fluid from the deposited substances.

According to a further embodiment of the invention, guide vanes can also be integrated into the base body. For this purpose, these guide vanes are configured without any undercuts relative to the direction fluid flow through the base body. This is to say that the flow direction, due to the tubular structure integrated in the base body, corresponds precisely to the demolding direction if the base body is produced by injection molding. Consequently, even with the integration of guide vanes, only two mold parts are required to produce the base body.

According to a further embodiment of the invention, the component produced by the aforementioned method forms a module that corresponds to the above-described structure. This means that the base body together with the attachment body must form a module housing, which encloses the collection chamber for the substances separated in the module. This module housing can be formed simply by assembling the base body and the attachment body. The opening is preferably provided in the parting line between the base body and the attachment body. This creates a module that can be cost-effectively produced and can be used to form a modular system as mentioned above.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
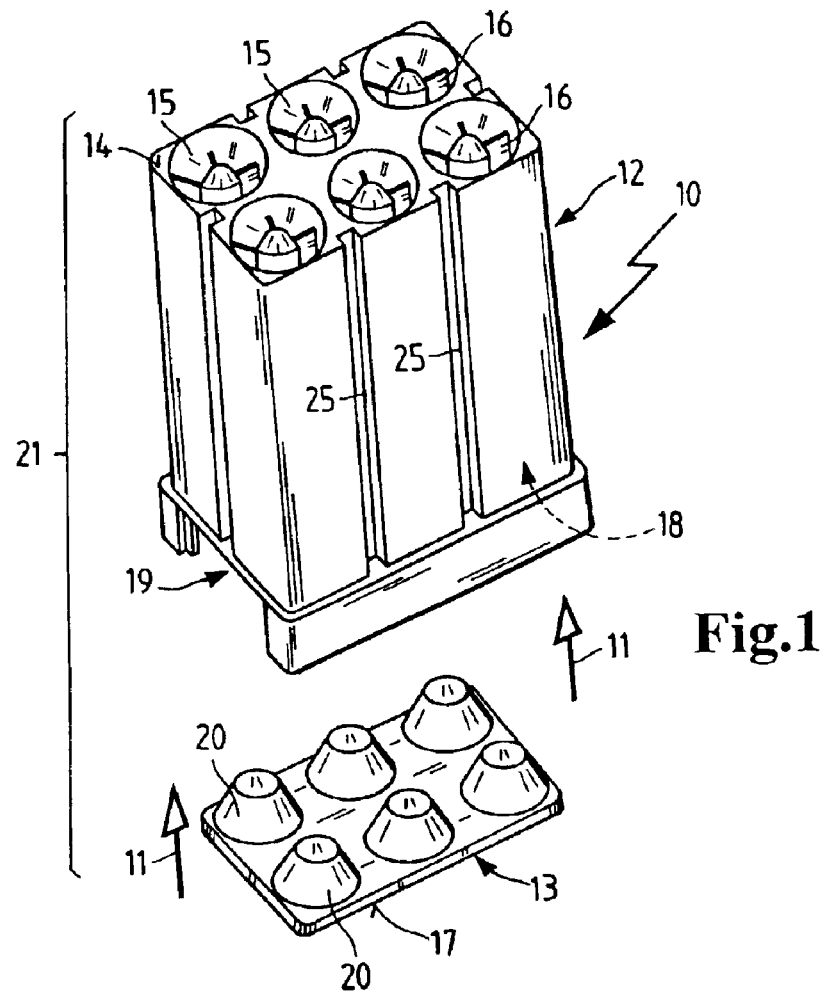
FIG. 1 is a perspective view of a module for a multicell cyclone, comprising a base body and an attachment body.

FIG. 1 shows a module 10 prior to assembly in accordance with the arrows 11. This module comprises a base body 12 and an attachment body 13. The base body forms an intake 14, which is formed by the opening of cyclone cells 15 on the untreated side. In these openings, guide vanes 16 may be seen, which are integrally formed with base body 12 without undercuts. Thus, the part shown can be produced by injection molding using two mold halves. These mold halves can be joined in the direction of arrows 11 and separated again after the injection molding process. The same also applies to the attachment body 13.

Attachment body 13 forms an outlet side 17, which is simultaneously configured as a cover to seal off a collection chamber 18 (not visible in FIG. 1), which is formed by the base body. In the parting line that is thereby created, an opening 19 is formed for discharging the separated substances deposited in collection chamber 18. From cyclone cells 15 the separated substances pass through an annular gap that is formed by the center tubes 20 (pointing upwardly in FIG. 1), which protrude into the cyclone cells. The interior of the center tubes forms holes in the outlet side 17, which serve to transport the cleaned fluid. As a whole, the exteriors of base body 12 and attachment body 13 form a module housing 21.

Figure 2:
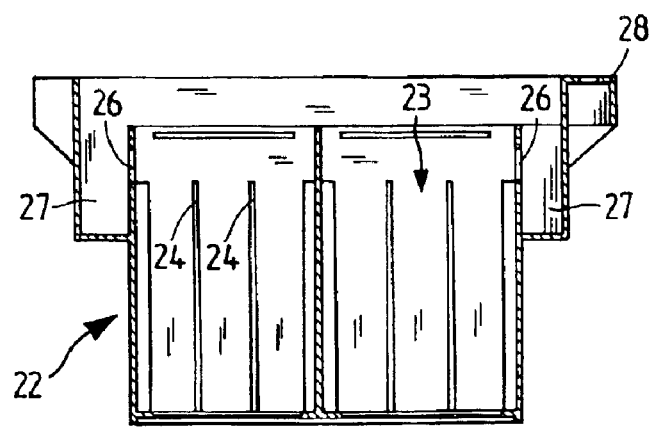
FIG. 2 shows a cross section through the center of the housing, in which the modules according to FIG. 1 can be inserted.

FIG. 2 shows a housing 22 with recesses 23 for integrating the modules according to FIG. 1. To this end, ribs 24, which correspond to respective grooves 25 (see FIG. 1) of the module, are formed in the housing. The recesses are furthermore provided with a cutout 26, which communicates with the openings 19 of the modules so that these openings discharge into an annular channel 27, which surrounds all the modules. A flanged joint 28 is provided to receive a housing cover (not shown). The same configuration of the housing with installed modules 10 is depicted in FIG. 4.

Figure 3:
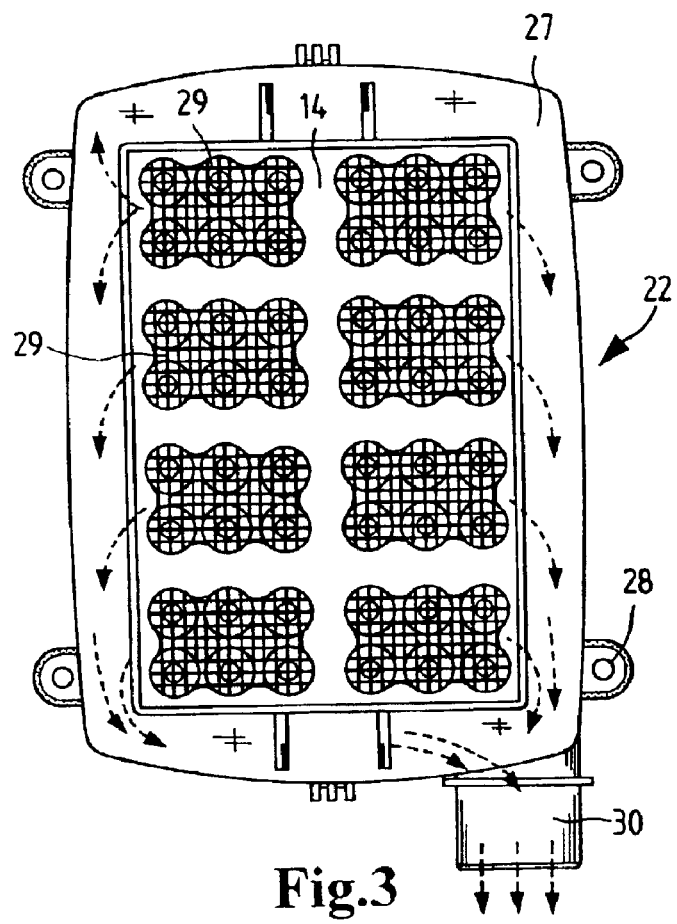
FIG. 3 is a top view of the housing according to FIG. 2 when sealed.
Figure 4:
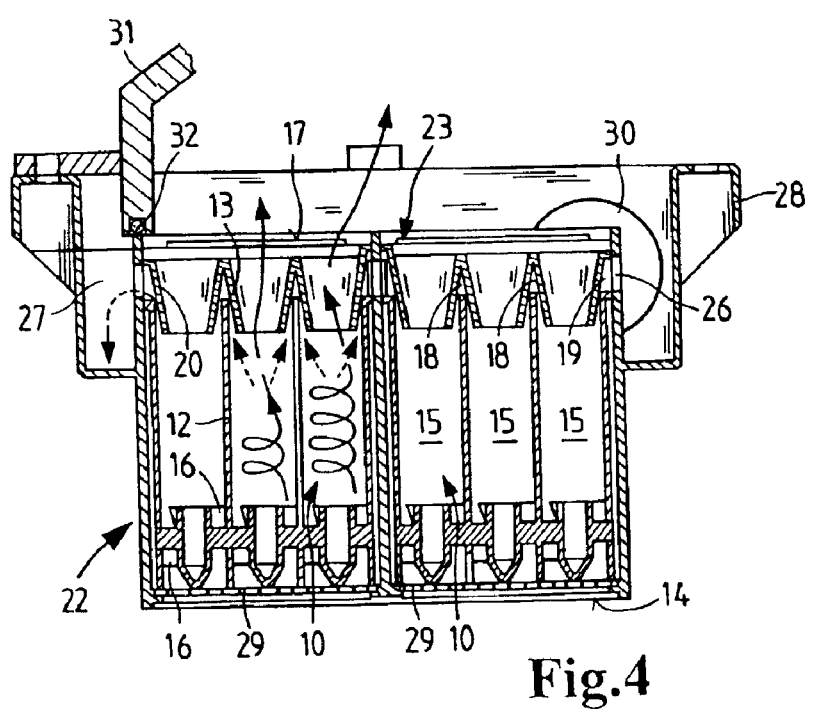
FIG. 4 shows the housing according to FIG. 2 with installed modules according to FIG. 1.

FIGS. 3 and 4 show housing 22 with installed modules 10. FIG. 3 shows a top view of housing 22 with intake 14. It can be clearly seen that the protective screens 29 are inserted into the recesses prior to installing modules 10. Also clearly visible is the annular channel 27, which surrounds the eight modules used and which ends in a particle discharge 30.

The protective screens are intended to prevent large particles from being drawn into the cyclone cells. Such particles would clog guide vanes 16 and thereby impair the functioning of the multicell cyclone over time. The interaction of these components is best seen in FIG. 4. Screens 29 are placed on the open bottom of recesses 23 for modules 10. Subsequently, the modules are inserted into these recesses. Also visible are the collection chambers 18, which are formed by center tubes 20. After modules 10 have been inserted into housing 22, a cover 31 is added, which separates the annular channel 27 from outlet side 17 by means of a seal 32.

The solid arrows in FIG. 4 indicate the path of the fluid to be cleaned and the cleaned fluid, respectively. Through the intake, this fluid reaches cyclone cells 15 and from there passes through center tubes 20 and outlet side 17 into the interior of cover 31. Due to the twist inside the cyclone tubes, a bypass flow that contains the substances to be removed is separated as indicated by the dashed arrows in FIGS. 3 and 4. FIG. 4 shows that this bypass flow travels along the outer edge of center tubes 20 into collection chamber 18, through openings 19 and cutouts 26 to reach annular channel 27. As may be seen in FIG. 3, the annular channel ensures uniform suction of the separated substances from cutouts 26 to particle discharge 30.

Figure 5:
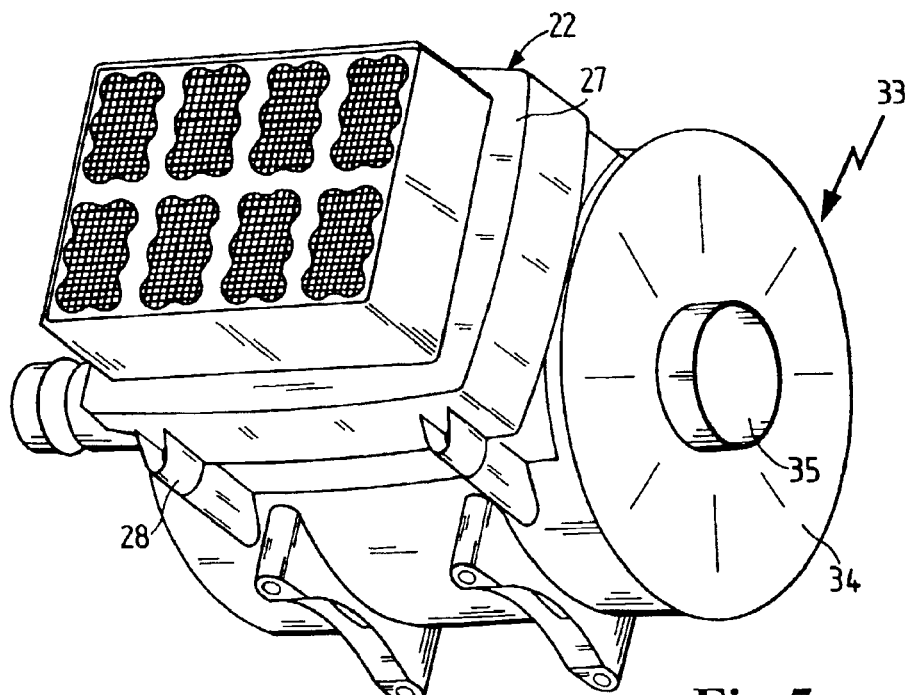
FIG. 5 is a perspective view of the integration of a housing according to FIG. 3 in a cylindrical air filter.

FIG. 5 shows an illustrative embodiment of the multicell cyclone according to FIGS. 3 and 4, in which the multicell cyclone is used as a precleaner for an air filter. For this purpose, the multicell cyclone with housing 22 is flanged to an air filter housing 34. The air filter housing functions as a cover 31 according to FIG. 4. As a result, the precleaned fluid, in this case air, is guided directly to the filter element installed in air filter housing 34, passes through this element, and thus reaches an outlet 35 for the filtered air.

Figure 6:
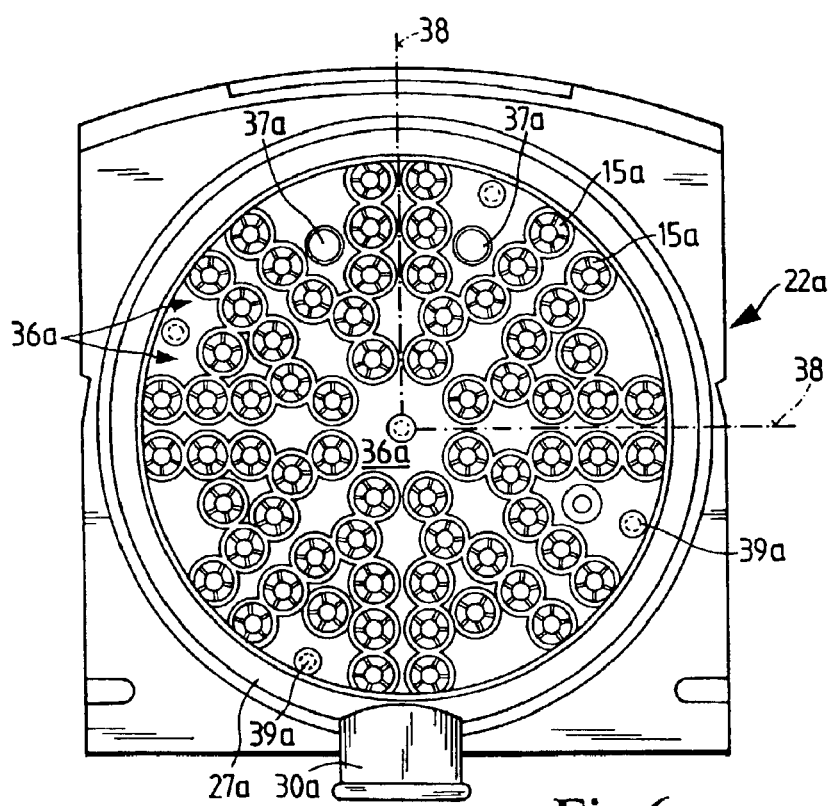
FIG. 6 is a top view of an alternative embodiment of a multicell cyclone in a circular configuration.

FIG. 6 is a top view of a multicell cyclone similar to the view shown in FIG. 3 but with the cyclone cells arranged symmetrically around a central axis. Housing 22a is shown with its cover. The configuration of the cyclone cells 15a, however, suggests the formation of channel structures 36a comprising, in particular, a circular annular channel 27a that ends in particle discharge 30a. Cyclone cells 15a of the corresponding groups are spaced so closely together that the walls of the respectively adjacent cyclone cells touch each other. Thus the channel structures 36a are formed as closed structures to enable a direct discharge of the separated substances. For this purpose, especially the particle discharge outlets of the individual cyclone cells (not visible in FIG. 6) are directed toward the channel structures 36a.

In the upper part of the multicell cyclone that is most remote from the particle discharge 30a, two dummy tubes 37a are used, each of which replaces a cyclone cell. This introduces additional air into the channel structures 36a in this region to support the removal of the separated substances. At the same time, the dummy tubes replace the two cyclone cells that are most likely to get clogged. Here, the removal of the substances would have to be effected against the force of gravity, since the multicell cyclone as shown is installed with particle discharge 30a pointing in downward direction.

The illustrated multicell cyclone can either be produced as a single module with different groups of cyclone cells, or the individual groups of cyclone cells can be produced as a separate module. It is feasible, for instance, to partition the multicell cyclone into quadrants corresponding to the broken line 38. The multicell cyclone is mounted inside housing 22a by mounting screws 39a.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A multicell cyclone comprising a plurality of cyclone cells, an intake side for the fluid to be cleaned, a discharge side for the cleaned fluid, and a cyclone housing with a particle discharge for substances separated from the fluid, wherein the cyclone cells are arranged in the cyclone housing in groups such that individual groups of cyclone cells are combined into individual modules, each of the modules having an individual module housing that cooperates with the cyclone cells therein to form a collection chamber for the separated substances, wherein the collection chambers are connected to the cyclone housing's particle discharge by channel structures, and wherein the channel structures have an expanded cross section, relative to the spacing of the cyclone cells of a group from each other, for carrying away the separated substances.

2. A multicell cyclone according to claim 1, wherein the groups of cyclone cells are arranged such that respectively adjacent cyclone cells touch one another and form closed channel structures.

3. A multicell cyclone according to claim 1, wherein the modules can be individually installed in the cyclone housing.

4. A multicell cyclone according to claim 1, wherein the groups of cyclone cells are arranged symmetrically around a central axis relative to one another.

5. A multicell cyclone according to claim 1, wherein the channel structures comprise an annular channel, which encircles all the groups of cyclone cells and communicates with the particle discharge.

6. A multicell cyclone according to claim 1, wherein at least one cyclone cell of a group of cyclone cells is replaced by a dummy tube which creates a connection between the intake and the channel structures having a lower flaw resistance than the replaced cyclone cell.

* * * * *